Dec. 27, 1966  E. J. CHICUREL  3,294,318
PROPORTIONAL SCALE SLIDE RULE
Filed July 22, 1965  4 Sheets-Sheet 1
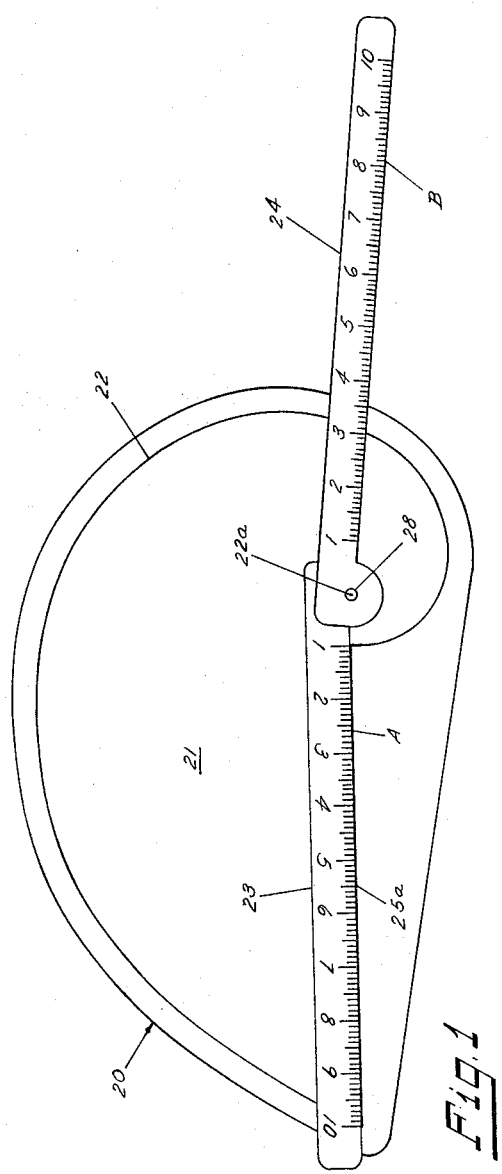
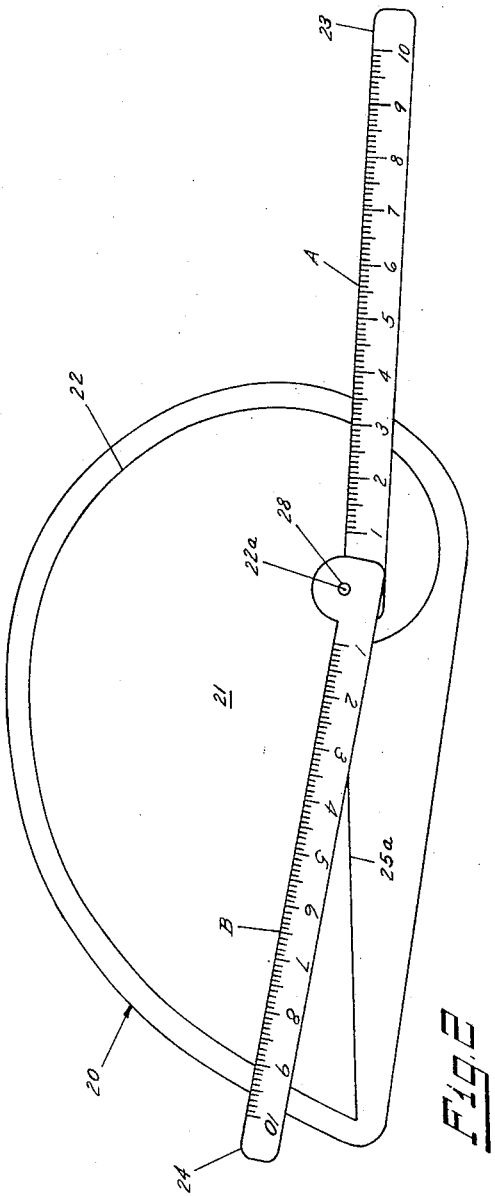
INVENTOR.
ENRIQUE J. CHICUREL
BY Joseph G. Werner
ATTORNEY Dec. 27, 1966  E. J. CHICUREL  3,294,318
PROPORTIONAL SCALE SLIDE RULE
Filed July 22, 1965  4 Sheets-Sheet 2

INVENTOR.
ENRIQUE J. CHICUREL
BY
Joseph G. Werner
ATTORNEY

Dec. 27, 1966  E. J. CHICUREL  3,294,318

PROPORTIONAL SCALE SLIDE RULE

Filed July 22, 1965  4 Sheets-Sheet 3

INVENTOR.
ENRIQUE J. CHICUREL
BY Joseph G. Werner
ATTORNEY

Dec. 27, 1966  E. J. CHICUREL  3,294,318
PROPORTIONAL SCALE SLIDE RULE
Filed July 22, 1965  4 Sheets-Sheet 4

INVENTOR.
ENRIQUE J. CHICUREL
BY
*Joseph G. Werner*
ATTORNEY

United States Patent Office 3,294,318
Patented Dec. 27, 1966

3,294,318
PROPORTIONAL SCALE SLIDE RULE
Enrique J. Chicurel, 212 Marion St.,
Madison, Wis. 53703
Filed July 22, 1965, Ser. No. 474,060
1 Claim. (Cl. 235—61)

This invention relates to improvements in mechanical calculating devices and more particularly to slide rules for performing mathematical calculations such as multiplication and division in an easy, rapid and accurate manner.

There are a great many people who would be richly rewarded in time and energy if they knew how to operate a slide rule; however, they are unable to do so because they do not possess the mathematical sophistication necessary to read the rather complicated, non-proportional, logarithmically distorted scales commonly used in slide rules. My improved calculating device remedies this situation.

Accordingly, it is a primary object of my invention to provide an improved mechanical calculating device having proportional scales which greatly simplifies the making of various mathematical calculations.

It is another object of my invention to provide an improved slide rule which is simple in design and with which mathematical calculations such as multiplication and division may be performed with a minimum of manipulations.

It is a further object of my invention to provide a compact calculating device which facilitates the making of accurate interpolations throughout the length of its scale.

Other objects and advantages of this invention will be apparent from the following detailed description taken in conjunction with the accompanying drawings wherein preferred embodiments of the principles of my invention have been selected for exemplification.

In the drawings:

FIG. 1 is a plan view showing my invention in its initial position for performing a particular multiplication problem.

FIG. 2 is a plan view showing my invention in its final position for performing a particular multiplication problem.

Figure 3:
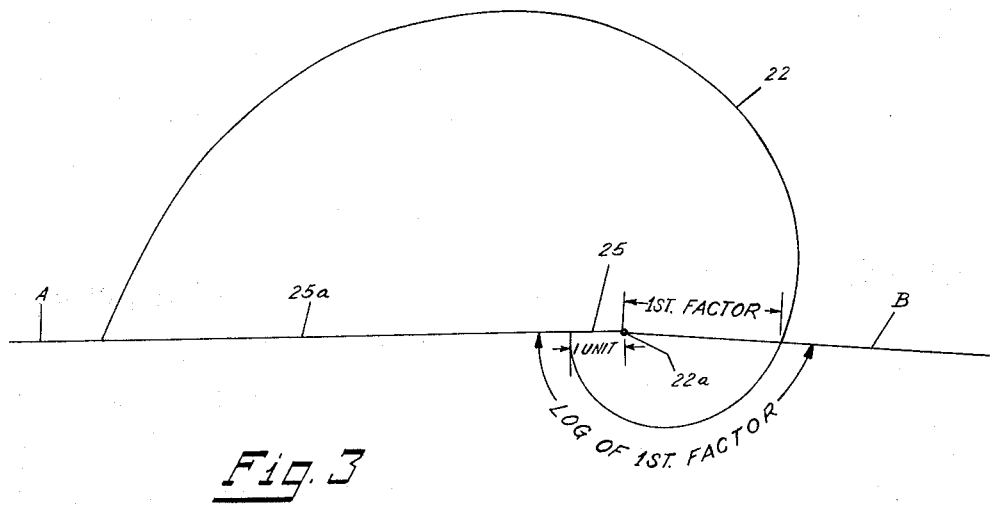
FIG. 3 is a schematic view of my invention in its initial position for the multiplication problem as shown in FIG. 1.

Referring more particularly to the drawings in which like numerals refer to like parts, it will be seen that one of the important improvements of my slide rule shown generally at 20 is the elimination of any distortion in the scales as is common in known slide rules for performing basic mathematical calculations. This is achieved by plotting a logarithmic curved expressed by the general formula, $$y = \text{antilog } x$$

As shown in FIGS. 1 and 2, my slide rule 20 comprises three basic parts: a substantially flat member 21 having a spiral curve 22 thereon and a pair of arms 23 and 24 pivotally attached to the flat member 21 at the center 22a of the spiral curve 22 and having proportional ten unit scales A and B respectively thereon.

Figure 4:
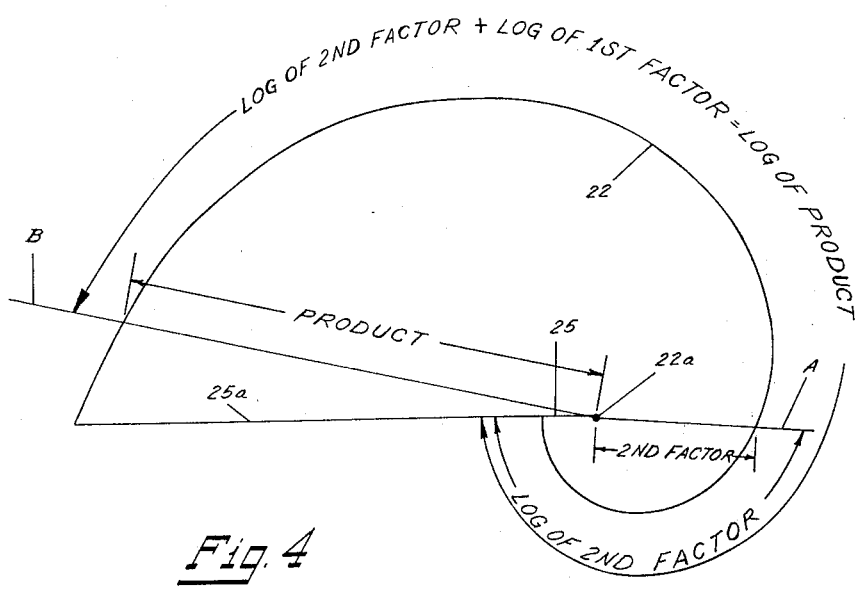
FIG. 4 is a schematic view of my invention in its final position as shown in FIG. 2.

In this embodiment of my invention the logarithmic curve is plotted in polar coordinates, i.e., $x=$ fraction of one revolution, $y=$ radial distance, thus forming the spiral 22 wherein the length of any radius of the spiral is the antilogarithm of the fraction of a revolution which that particular radius is from that radial line 25, shown in FIGS. 3 and 4, which intersects the spiral at a distance of one unit and which shall be referred to as the unit radius 25. In other words, the spiral 22 is drawn so that a radial line extending from the center of the spiral or pivot point 22a to the spiral grows in proportion with the angle of revolution. The radius grows from one unit to ten units in 360°. The unit radius 25 breaks the continuity of the spiral 22 and as shown in FIGS. 1 through 6, an extension 25a of the unit radius 25, connects both "1" and "10" units on the spiral.

As seen in FIGS. 1 and 2, the two arms 23 and 24 are rotatable about the center 22a of the spiral 22 in a plane parallel to the plane of the substantially flat member 21. Also as seen in FIGS. 1 and 2 each of the arms 23 and 24 has a proportional ten unit scale thereon, begnning at the center 22a of the spiral 22. Each unit on the scales A and B is equal in length to the unit radius 25 of the spiral 22. Each unit is subdivided into ten proportional, smaller units, and these in turn may be subdivided further into halves, quarters or tenths according to the size of the slide rule.

The two arms 23 and 24 may be attached to the substantially flat member 21 by a pivot member 28 which allows the two arms 23 and 24 to be rotated independently or in fixed relation. In other words, when manipulating the arms 23 and 24 to perform either multiplication or division one arm may first be rotated in an independent manner until a fixed angular distance is established between the arms whereupon the two arms may then be rotated in fixed relation to each other.

It will be noted that two radii extending from the center 22a of spiral 22 with a fixed angular distance between them are related by the same ratio, no matter in what position they might be relative to the unit radius 25 and its extension 25a. For example, the unit radius 25 and a radius two units long are separated on the spiral 22 by a certain angular distance. Likewise, a radius two units long and a radius four units long are also separated by the same angular distance.

Multiplication, as for example 3×3 which is shown in FIGS. 1 and 2, is performed by this embodiment of my invention by taking the following steps:

(1) Holding scale A on the extension 25a of the unit radius 25, rotate scale B to read the first factor, 3, as shown in FIG. 1. This sets the angular distance between scales A and B.

(2) Rotate both scales A and B as a unit until scale A reads the second factor, 3, as shown in FIG. 2.

(3) Where scale B is intersected by spiral 22 read the product, 9, as shown in FIG. 2.

FIGS. 3 and 4 are schematic illustrations of the multiplication problem shown in FIGS. 1 and 2 with FIG. 3 corresponding to FIG. 1 and FIG. 4 corresponding to FIG. 2. In the initial position as shown in FIG. 3, scale A is set on the extension 25a of the unit radius 25 while scale B is set at the first factor, 3. In this position the angle between the extension 25a of the unit radius 25 and the first factor 3 represents the logarithm of the first factor.

FIG. 4 shows the final position for the multiplication problem after both scales have been rotated as a unit so that scale A which was originally set at the extension 25a of the unit radius 25 now intersects the spiral 22 at the second factor, 3, and the spiral 22 intersects scale B at the product, 9. It is readily seen in FIG. 4 that this manipulation adds the logarithm of the second factor to the logarithm of the first factor thereby making the angle between the extension 25a of the unit radius 25 and scale B equal to the logarithm of the product. The radial distance is the antilogarithm of the logarithms of the product; that is, the product itself.

It should be noted that the above described multiplication problem may be commenced by holding either scale A or B on the extension 25a of the unit radius 25 and then rotating the other scale to read the first factor.

Figure 5:
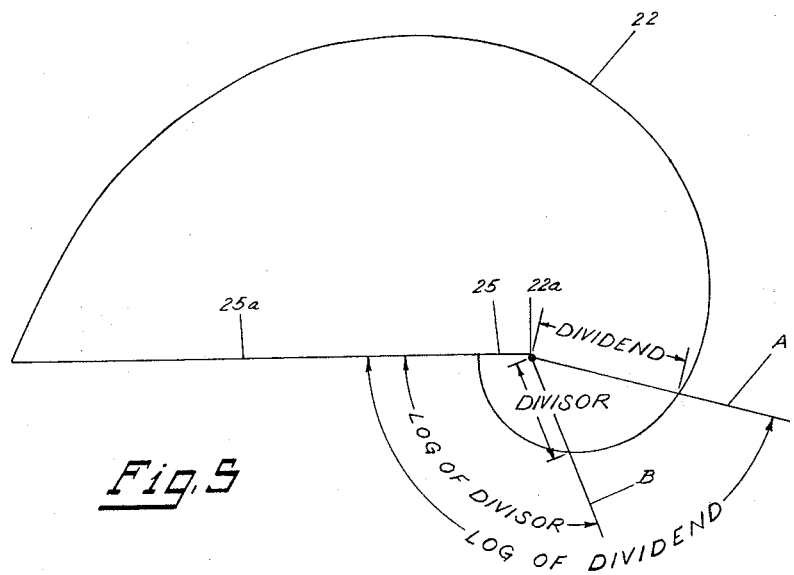
FIG. 5 is a schematic view of my invention in its initial position for a division problem.
Figure 6:
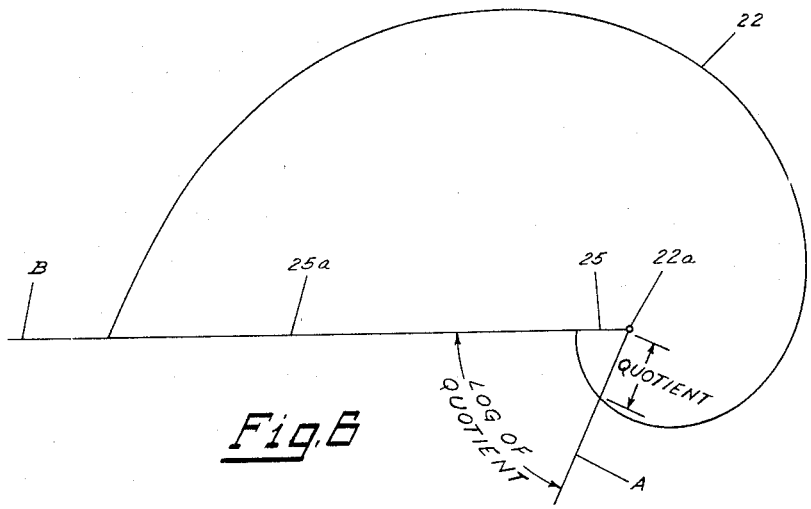
FIG. 6 is a schematic view of my invention in its final position for the division problem shown in FIG. 5.

Division, as for example 3÷2 depicted in FIGS. 5 and 6, is performed by this embodiment of my invention by taking the following steps:

(1) Rotate either scale A or B to read the dividend, 3.

(2) Holding the first scale on the dividend, 3, rotate the second scale to read the divisor, 2, thus, setting the angular distance between the two scales.

(3) Rotate both scales as a unit until the second scale coincides with the extension 25a of the unit radius 25.

(4) Where the spiral 22 intersects the first scale, read the quotient, 1.5.

FIGS. 5 and 6 are schematic illustrations of the division 3÷2. FIG. 5 shows the initial position of the scales A and B where scale A is set at the dividend, 3, and scale B is set at the divisor, 2. The angle between the extension 25a of the unit radius 25 and the scale A represents the logarithm of the dividend, 3, and the angle between the extension 25a of the unit radius 25 and the scale A represents the logarithm of divisor, 2. The angle between scales A and B is thus the logarithm of the quotient.

FIG. 6 shows the final position of the division problem after the scales A and B have been rotated as a unit so that scale B is set on the extension 25a of the unit radius 25. Since scales A and B were rotated as a unit the angle between them will still be the logarithm of the quotient thereby making it easy to read the quotient, 1.5, where spiral 22 intersects scale A.

As in known slide rules the decimal point must be determined by the user.

No direction has been specified for the rotations in either multiplication or division, however, sometimes a certain direction is preferable. In multiplication, for instance, it is probably more convenient to use clockwise rotation when any of the factors have a leftmost digit equal to or greater than 5. For example, let us consider the multiplication of 9.6×7.5. Holding either scale A or B on the extension 25a of the unit radius 25, rotate the second scale in a clockwise direction until it reads 9.6. Now rotate both scales as a unit in a clockwise direction until the first scale reads 7.5. In this position the second scale will read the product, 72.

Figure 7:
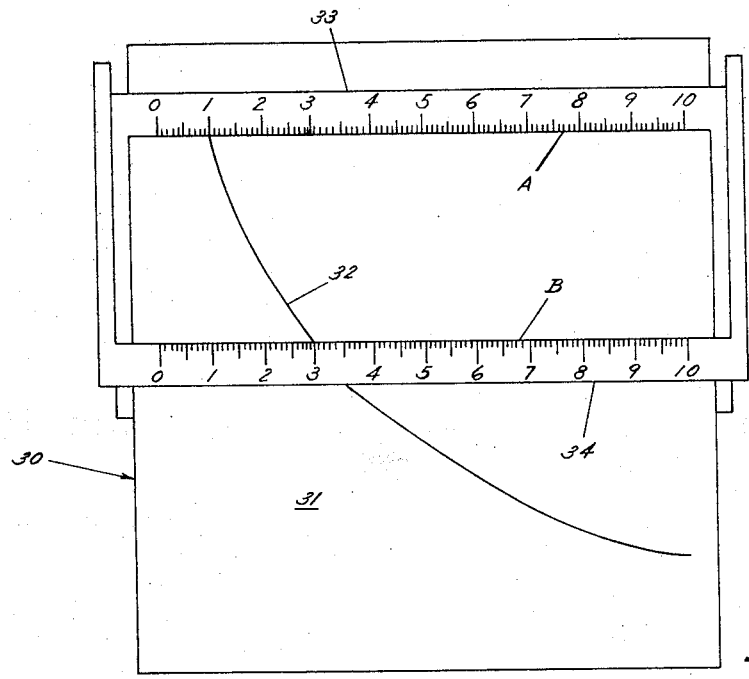
FIG. 7 is a plan view of a second embodiment of my invention shown in the initial position for performing a particular multiplication problem.
Figure 8:
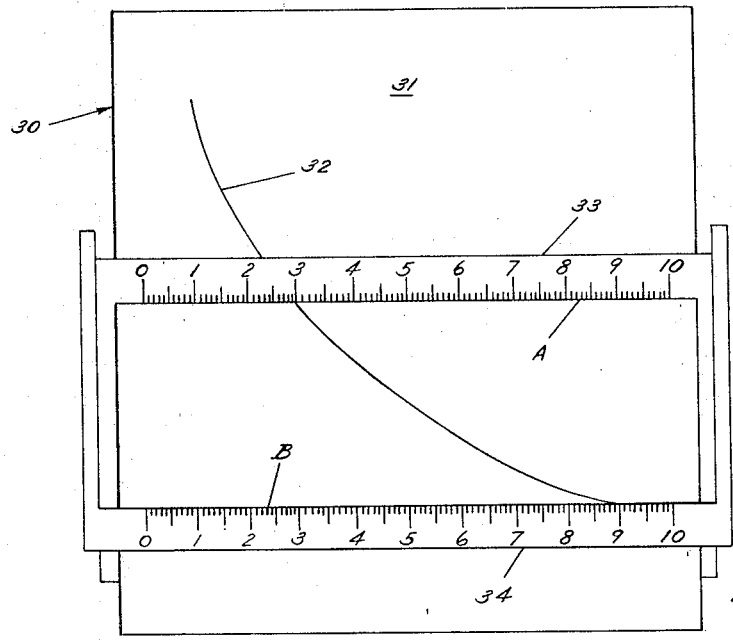
FIG. 8 is a plan view of the second embodiment of my invention shown in the final position of the multiplication problem as shown in FIG. 7.

FIGS. 7 and 8 show a second embodiment 30 of my invention. As seen in the FIGS. 7 and 8, embodiment 30 also comprises three basic parts: a substantially flat member 31 having a logarithmic curve 32 thereon and a pair of arms 33 and 34 slidably attached to the flat member 31 and having proportional ten unit scales A and B thereon. In this embodiment the substantially flat member 31 is rectangular in shape and the two arms 33 and 34 are slidable along the edges of the substantially flat member in a plane parallel to the plane of the flat member. The curve 32 is drawn by Cartesian coordinates forming a logarithmic curve where the ordinate (which is parallel to the scales) is the antilogarithm of the abscissa (which is perpendicular to the scales). As in the first embodiment of my invention, the logarithmic curve 32 of this embodiment is plotted by simply obtaining values of $y$ for a number of values of $x$ from the formula $y = \text{antilog } x$, thereby determining the corresponding $x$ and $y$ coordinates of the curve for the different values. The difference in the curves 22 and 32 of each embodiment occurs because the first embodiment is plotted in polar coordinates while the second embodiment is plotted in Cartesian coordinates.

The two arms 33 and 34 of this embodiment are slidably attached to the substantially flat rectangular member 31 and may be moved either independently or in fixed relation. In other words the arms 33 and 34 are so attached that when performing either multiplication or division one arm may first be moved in an independent manner until a fixed distance is established between the arms whereupon the two arms may then be moved in fixed relation to each other.

As in the first embodiment of my invention each arm has proportional ten unit scales thereon with each unit on the scales corresponding in length to one unit on the abscissa of the logarithmic curve 32. In other words, when the arms 33 and 34 are moved across the substantially flat rectangular member 31 the unit marks on each arm intersect the logarithmic curve 32 at their corresponding values.

Multiplication, such as 3×3, which is shown in FIGS. 7 and 8, may be performed by this second embodiment 30 of my slide rule by taking the following steps:

(1) Set scale A so that curve 32 intersects it at 1.

(2) Holding scale A at the position of step 1, move scale B to read the first factor, 3, thus, determining the fixed distance between the two scales. This position is shown in FIG. 7.

(3) Slide both scales A and B as a unit until scale A reads the second factor, 3.

(4) Where the curve 32 intersects scale B, read the product, 9, as shown in FIG. 8.

Division such as 6÷3 may be performed by this second embodiment 30 of my invention by taking the following steps:

(1) Set one scale to read the dividend, 6.

(2) Holding the first scale on the dividend 6, move the second scale to read the divisor 3, thus determining the fixed distance between the two scales.

(3) Slide both scales as a unit so that they both remain within the curve and one of the scales reads 1 or 10.

(4) Read the quotient, 2, on the other scale.

My invention may preferably be made of plastic or any other suitable material.

It should be pointed out that curves for performing other mathematical calculations, such as for example, square roots and cube roots as well as a curve for multiplication by π may be added to either embodiment of my invention.

It is understood that my invention is not confined to the particular construction and arrangement of parts herein illustrated and described, but embraces all such modified forms thereof as may come within the scope of the following claim.

I claim:

A proportional scale slide rule for performing mathematical calculations such as multiplication and division comprising:

(a) a substantially flat member having a non-scaled antilogarithmic curve thereon, (b) said curve formed in a Cartesian coordinate system such that the ordinate is the antilogarithm of the abscissa, (c) a first arm slidably attached to said flat member for straight line movement in a plane substantially parallel to the plane of said flat member, (d) a second arm slidably attached to said first arm for straight line movement parallel to that of said first arm in a plane substantially parallel to the plane of said flat member whereby said arms may be moved independently of each other or in fixed relation, and (e) each of said arms having a straight equi-spaced ten unit scale thereon beginning at a distance of one unit from the axis of the ordinate, said scales cooperating with said curve whereby the factors are set and the product is read on said scales against said curve during multiplication and whereby the dividend and divisor are set and the quotient is read on said scales against said curve during division.

References Cited by the Examiner

UNITED STATES PATENTS

| | | | |
|---|---|---|---|
| 1,021,965 | 4/1912 | Bolton | 235—61 |
| 1,042,360 | 10/1912 | Maguire | 235—61 |
| 1,382,011 | 6/1921 | O'Neill | 235—70 |
| 1,383,492 | 7/1921 | Seely | 235—61 |
| 1,435,422 | 11/1922 | Schiske | 235—61 |
| 1,436,282 | 11/1922 | Nuckolls | 235—67 |
| 2,394,563 | 2/1946 | Purcell | 235—84 |
| 2,426,362 | 8/1947 | MacDonald | 235—84 |
| 2,544,224 | 3/1951 | Hachmuth | 235—84 |
| 2,564,227 | 8/1951 | Pepper | 235—67 |
| 2,569,454 | 10/1951 | Cole | 235—70 |
| 3,076,596 | 2/1963 | Jaderholm | 235—84 |
| 3,130,905 | 4/1964 | Hsiao | 235—89 |

FOREIGN PATENTS 235,975   4/1908   Germany.

RICHARD B. WILKINSON, *Primary Examiner.*

T. J. ANDERSON, L. J. CAPOZI, *Assistant Examiners.*